Dec. 19, 1939.　　　H. O. DROTNING　　　2,183,989

AIR VENT FOR FOLDING CAMERAS

Filed Sept. 13, 1938

Henry O. Drotning
INVENTOR

BY
ATTORNEYS

Patented Dec. 19, 1939

2,183,989

UNITED STATES PATENT OFFICE 2,183,989

AIR VENT FOR FOLDING CAMERAS

Henry O. Drotning, Rochester, N. Y., assignor to Eastman Kodak Company, Rochester, N. Y., a corporation of New Jersey Application September 13, 1938, Serial No. 229,722

6 Claims. (Cl. 95—45)

The present invention relates to photography, and more particularly to photographic cameras.

One object of my invention is to provide an air vent for a camera bellows to facilitate opening and closing the camera. Another object is to provide such an air vent in a camera in which the shutter casing and lens are moved as a unit in focusing, and wherein the air vent is adjacent the front end of the bellows. Another object is to provide such an air vent which is maintained throughout the entire focusing adjustment. And still a further object is to provide an air vent for the camera which requires the fewest number of parts, the focusing ring itself being so formed and arranged as to constitute a part forming said air vent. And yet another object of the invention is to provide an air vent which is simple in construction, easy to assemble, and effectual in preventing light from leaking into the camera.

Briefly, my invention comprises a folding camera in which the shutter casing and lens are moved as a unit relative to the bellows for focusing, and in which the parts going to make up the mounting of the shutter and lens unit on the forward end of the bellows are so formed as to provide the desired air vent for the bellows when properly assembled.

Figure 1:
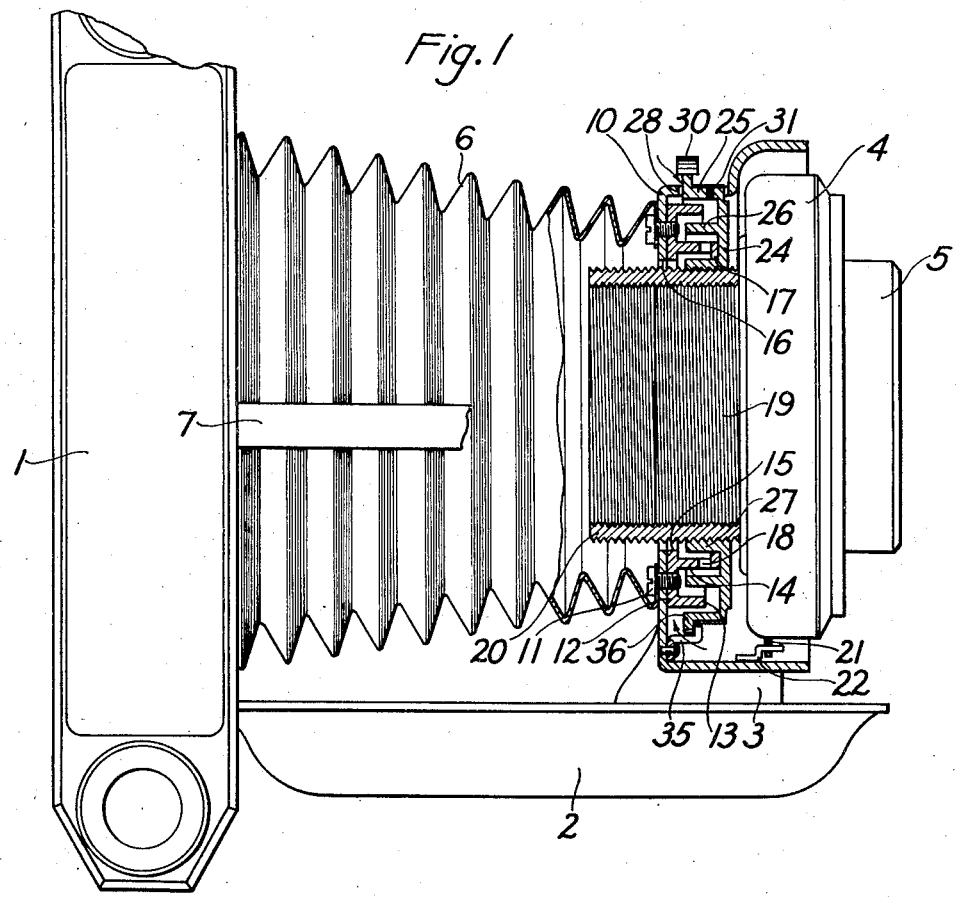
Figure 2:
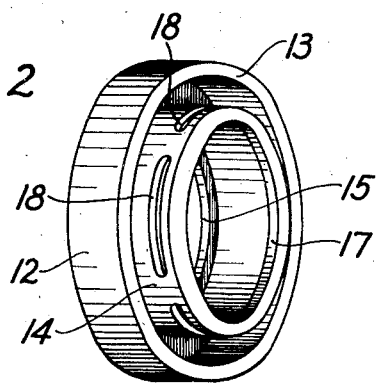

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing in which:

Fig. 1 is a side view of a folding camera, partly in section and partly in elevation, which is equipped with an air vent constructed in accordance with and embodying a preferred form of my invention, and Fig. 2 is a perspective of one of the members going to make up the air vent when the parts are assembled as shown in Fig. 1.

Like reference characters refer to corresponding parts throughout the drawing.

I have illustrated my invention as applied to a well-known type of folding camera herein shown as consisting of a body portion 1 to which is hinged the usual bed 2 on the forward end of which the usual uprights 3 are fixed. To these uprights 3 is pivoted, or otherwise suitably connected, the supporting structure for the shutter casing 4, lens 5, and forward end of the bellows 6, so as to allow the bellows, lens, and shutter casing to fold into the camera body 1 when the camera is closed. The lens and shutter mechanism are further supported in their erected position by suitable braces 7 extending between the camera body 1 and the supporting structure for the shutter, lens, and bellows, and being connected thereto so as to allow the camera to be closed. Ordinarily, cameras of this type are focused by either moving the lens, shutter casing, and forward end of the bellows together along the bed, by moving the lens as a whole relative to the other mentioned parts, or by moving the individual lens elements relative to one another. In such instances the forward end of the bellows can be permanently attached to the shutter casing or a part fixed thereto. However, with a camera constructed in accordance with the present invention the focusing is accomplished by moving the shutter casing and lens as a unit relative to the front of the bellows so that the usual connection between the bellows and the shutter casing must be modified as clearly pointed out hereinafter.

Referring now particularly to Fig. 1 wherein a preferred embodiment of the present invention is shown, 10 is an annular front member which provides a support for the front end of the bellows, as well as the lens and shutter case unit, and this front member may be connected to the uprights 3 in any well-known manner to allow the bellows, and the lens and shutter unit supported thereby to be folded into the camera, or erected as shown. The braces 7 will necessarily be connected to this annular front member 10 or the uprights 3 in a suitable manner, not shown, to allow for folding and erection of the camera front. Inasmuch as the connection between the front member 10, the uprights 3, and the braces 7 can be accomplished in any number of suitable well-known ways, and this connection forms no part of the present invention, a detailed showing or description of the same is not deemed necessary.

The forward end of the bellows 6 is connected to the rear face of the annular front member 10 by large headed screws 11, the head of which are large enough to secure a light-tight joint at this point and will not tear through the bellows material. Another way of accomplishing this connection would be to insert a continuous metal strip between the heads of the screws and the bellows, which strip would prevent the screws from tearing through the bellows material and would, due to its length, insure the bellows being held tight at all points to the face of the annular front member. To the front face of the annular front member 10 is fastened, by the same screws 11, an annular ring member 12, a detail of which is shown in Fig. 2. This ring member includes concentric flanges 13 and 14 which extend axially from one face of the ring member, and the opening 15 of the ring member is of the same diameter as the opening 16 in the annular front member 10. The inner flange 14 of the ring member 12 is made slightly longer than the flange 13, and the end of this flange is provided with a turned down shoulder 17 which provides a bearing member as will be apparent from the following description. The flange 14 is provided with a plurality of peripheral slots 18 located just behind the shoulder 17, which slots form a part of the air vent for the bellows as is apparent from the drawing. It is pointed out that although I have shown the ring member 12 and the annular front member 10 as two separate elements, such a construction being used to facilitate assembly and cheapen the construction, these two parts could be formed as a single element without going beyond the scope of the present invention.

The shutter casing 4 and the lens 5 form a unit having a threaded extension 19 which is screwed into the focusing sleeve 20, and is held in said sleeve against accidental movement by any suitable means, such as shellac, etc. The focusing sleeve 20 extends axially through the openings 15 and 16 in the annular front member 10 and the ring member 12, respectively, and it should be noticed that the diameter of the focusing sleeve is less than the diameter of the openings 15 and 16 so that an opening is left into the interior of the bellows which forms a part of the air vent. Any number of suitable means may be provided for holding the focusing sleeve against rotation but permitting any axial movement thereof for focusing. As one way of accomplishing this, I have shown a perforated plate 21 attached to the lower face of the shutter casing 4 through which a pin 22 fixed to the annular front member 10 passes. The engaging portion of this pin extends axially of the annular front member 10 and is sufficiently long to permit of the shutter and lens unit moving through its entire focusing range without becoming disconnected from the perforated plate 21. It will be readily understood that since the shutter and lens unit is permanently fixed to the focusing sleeve after once being assembled therein, that to prevent rotation of the shutter and lens unit as described will also prevent rotation of the focusing sleeve.

The focusing sleeve 20 is supported by the rotatable focusing ring 24 with which it is in threaded engagement. This focusing ring includes concentric flanges 25, 26 and 27, the flange 27 of which is internally threaded to engage the focusing sleeve 20. When assembled the flanges 26, 25, 27, of the focusing ring 24 interlock with the flanges 13 and 14 on the ring member 12 to form a tortuous light-tight air vent from the interior of the bellows 6 to the exterior thereof. Flange 25 of this focusing ring 24 extends through a peripheral slot 28 in the top longitudinally extending portion of the annular front member 10, and includes a finger-piece 30 extending to the outside of the annular member 10 by means of which the focusing ring 24 can be rotated relative to the annular front member 10. It will be readily understood by those skilled in the art that the peripheral slot 28 in the annular front member will be sufficiently long to allow sufficient rotation of the focusing ring to move the focusing sleeve 20 throughout its entire focusing range. The length of this slot will, of course, be determined by the pitch of the threads between the focusing ring and the focusing sleeve. A focusing scale 31 is attached to the periphery of the focusing ring 24 by any suitable means to cooperate with an index, not shown, which may be fixed to the rear face of the annular front member 10 adjacent the peripheral slot 28 therein, the cooperation of this scale and index serving to give a visual indication of the focusing adjustment of the camera.

When assembled the focusing ring 24 is held against axial movement in one direction by the shoulder 17 on the flange 14 of the ring member 12, which shoulder engages one face of the focusing ring; and against axial movement in the other direction by a thrust plate 35, fixed to the lower portion of the annular front member, which overhangs a shoulder 36 on the focusing ring. Axial movement of this focusing ring 24 is also prevented by virtue of the engagement between the peripheral slot 28 in the periphery of the annular front member 10 and the flange 25 on the focusing ring, said flange and slot being substantially of the same width. Referring to Fig. 1, it will be apparent that by virtue of the bearing which shoulder 17 of the ring member 12 affords the focusing ring, the focusing ring is held against radial movement relative to the focusing sleeve 20 while being permitted a rotative movement.

The flanges 13, 14 and 25, 26 and 27 are so spaced radially of the ring member 12 and the focusing ring 24, respectively, that in the assembled position of these two parts the flanges of one interlock with the flanges of the other to provide a tortuous light-tight air vent into the interior of the bellows. The flange 14 on the ring member 12 is of such a length as to hold the focusing ring 24 a sufficient distance from the ring member 12 that the ends of the remaining flanges will be spaced from the faces of said members to maintain the air vent; and the peripheral slots 18 in this flange 14 serve to complete the air vent through flange 14. The free entrance or exit of air into or out of the bellows is made possible through this air vent, as shown by the directional arrows indicating an entrance of air which is the case when the camera is open, and this air vent is maintained at all times irrespective of the focusing adjustment. When the focusing ring 24 is rotated, the focusing ring 24, due to its inability to move axially, causes an axial movement of the focusing sleeve 20 and along with it the shutter and lens unit for the focusing adjustment. Since the axial relationship of the focusing ring 24 and ring member 12 is not changed during the focusing adjustment, the air vent formed by the interlocking flanges of the two is constantly maintained. The arrangement disclosed, whereby the focusing ring is held against axial movement and the focusing sleeve in threaded engagement therewith is confined to axial movement, is preferred because it insures that the position of the scales carried by the shutter casing, whatever such scales might be, the trigger, and other parts which might be carried by the casing, will be found in the same position at all times regardless of the degree of focusing adjustment. While such an arrangement involves no relative axial movement between the focusing ring 24 and the ring member 12 so that the air vent formed between the two is maintained, it is possible that an arrangement might be desired whereby the focusing ring might carry the shutter and lens unit directly, and upon being rotated would be moved axially to effect the desired focus. The herein disclosed relationship between the focusing ring 24 and the ring member 12 could be adapted to an arrangement of the type just mentioned by merely making the flanges 13 and 14 of ring member 12, and flanges 25, 26 and 27 of the focusing ring 24 of such a length that the ends thereof would be spaced from the adjacent faces of the opposing members in one extreme focusing position so that the air vent would be maintained, and would have an overlapping or interlocking relationship in the opposite extreme focusing position so as to maintain the tortuous light-tight air vent.

Having thus described my invention, what I claim is new and desire to secure by Letters Patent of the United States is:

1. In a photographic camera having a bellows, and a shutter and lens movable as a unit relative to said bellows for focusing, the combination of an annular member fixed to the forward end of said bellows, baffles extending axially from one face of said annular member and spaced radially thereof from one another, a focusing sleeve carrying said shutter and lens unit extending axially through said annular member and being proportioned relative to the opening in said annular member so that an air space connecting the interior of the bellows remains therebetween, a focusing ring rotatably mounted relative to said annular member and connected to said focusing sleeve so that rotation thereof serves to move said focusing sleeve axially for focusing, and baffles extending axially from the face of said focusing ring, and spaced radially thereof to interlock with the baffles on said annular member to form a tortuous air passage of which said air space is a part between the interior and exterior of the bellows.

2. In the photographic camera having a bellows, and a shutter and lens movable as a unit relative to said bellows for focusing, the combination of a ring member fixed to the forward end of said bellows, concentric flanges on one face of said ring member and extending axially thereof, a focusing sleeve carrying said shutter and lens unit extending axially through said ring member, the diameter of said sleeve being less than that of the opening in the ring whereby an air space into the interior of the bellows is provided, a focusing ring rotatably mounted relative to said ring member and connected to said focusing sleeve whereby rotation thereof serves to move said focusing sleeve axially for focusing, and concentric flanges on one face of said focusing ring and extending axially thereof adapted to interlock with the flanges on said ring member to form a tortuous light tight air passage into the interior of the bellows of which said air space is a part.

3. In a photographic camera having a bellows, and a shutter and lens movable as a unit relative to said bellows for focusing, the combination of a ring member fixed to the forward end of said bellows, a threaded focusing sleeve carrying said shutter and lens unit extending axially through the opening in said ring and being of smaller diameter than the opening in said ring, a focusing ring rotatably mounted relative to said ring member and in threaded engagement with said sleeve whereby rotation thereof causes an axial movement of the sleeve, means for holding said focusing ring against axial movement relative to said ring member, and interlocking baffles on said ring member and said focusing ring adapted to form a tortuous light proof air passage between the interior and exterior of the bellows.

4. In a photographic camera having a bellows, and a shutter and lens movable as a unit relative to said bellows for focusing, the combination of a ring member fixed to the forward end of said bellows, a threaded focusing sleeve carrying said shutter and lens unit extending axially through the opening in said ring and being of smaller diameter than the opening in said ring, a focusing ring rotatably mounted relative to said ring member and in threaded engagement with said sleeve, whereby rotation thereof causes an axial movement of the sleeve, and cooperating means on said ring member and said focusing ring adapted to form a tortuous light proof air passage between the interior and exterior of the bellows, said means including concentric flanges on adjacent faces of the ring member and focusing ring arranged to interlock with one another in a manner to form an air passage of which the space between the ring member and the focusing sleeve is a part.

5. In a photographic camera having a bellows, and a shutter and lens movable as a unit relative to said bellows for focusing, the combination of a ring member fixed to the forward end of said bellows, concentric flanges extending axially from one face of said ring member, one of said flanges being longer than the others and provided with a peripheral slot, a threaded focusing sleeve carrying said shutter and lens unit extending axially through said ring member, and having a diameter less than that of the opening in the ring member, a rotatable focusing ring in threaded engagement with said focusing sleeve and held against axial movement in one direction through the engagement of one face thereof with the longer of said flanges on the ring member, means for holding said focusing ring against axial movement in the other direction, and concentric axial flanges on the face of the focusing ring adjacent said ring member adapted to interlock with the flanges on the ring member and form a tortuous light tight air passage between the interior and exterior of the bellows of which the opening between the ring member and the focusing sleeve and said peripheral slot is a part.

6. In a photographic camera having a bellows, and a shutter and lens movable as a unit relative to said bellows for focusing, the combination of an annular front member fixed to the forward end of the bellows and provided with a peripheral slot, a ring member fixed to said front member, a threaded focusing sleeve extending axially through said ring member and front member and of smaller diameter than the diameter of the opening in either of the same, a focusing ring in threaded engagement with said focusing sleeve and arranged to extend through the peripheral slot in said front member whereby it is capable of rotation but is held against axial movement, and concentric flanges extending axially from the face of said focusing ring adjacent the ring member, and adapted to interlock with the flanges on said ring member to form a tortuous light tight air passage between the interior and exterior of the bellows.

HENRY O. DROTNING.